(12) United States Patent
Corona et al.

(10) Patent No.: US 11,631,197 B2
(45) Date of Patent: Apr. 18, 2023

(54) TRAFFIC CAMERA CALIBRATION

(71) Applicant: Ford Global Technologies, LLC, Dearborn, MI (US)

(72) Inventors: Enrique Corona, Canton, MI (US); Armin Parchami, Ann Arbor, MI (US); Faizan Shaik, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 17/060,158

(22) Filed: Oct. 1, 2020

(65) Prior Publication Data
US 2022/0108473 A1   Apr. 7, 2022

(51) Int. Cl.
| | | |
|---|---|---|
| G06T 7/80 | (2017.01) |
| G06T 7/70 | (2017.01) |
| G06T 7/20 | (2017.01) |
| G06T 7/536 | (2017.01) |
| G08G 1/09 | (2006.01) |
| H04N 17/00 | (2006.01) |

(52) U.S. Cl.
CPC ............... *G06T 7/80* (2017.01); *G06T 7/20* (2013.01); *G06T 7/536* (2017.01); *G06T 7/70* (2017.01); *G08G 1/09* (2013.01); *H04N 17/002* (2013.01); *G06T 2207/10016* (2013.01); *G06T 2207/30236* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 10,380,433 B2 | 8/2019 | Guarneri et al. | |
| 10,529,083 B2 | 1/2020 | Uliyar et al. | |
| 11,257,374 B2* | 2/2022 | Sato ..................... | H04W 4/023 |
| 2015/0092057 A1* | 4/2015 | Lee ....................... | G06V 10/255 |
| | | | 348/148 |
| 2016/0012589 A1* | 1/2016 | Hamer ................... | H04N 7/181 |
| | | | 348/148 |
| 2017/0098304 A1* | 4/2017 | Blais-Morin .......... | F16M 11/28 |
| 2018/0040139 A1* | 2/2018 | Bernhardt ............... | G06T 7/248 |

FOREIGN PATENT DOCUMENTS

| | | |
|---|---|---|
| JP | 3099691 B2 | 8/2000 |
| WO | 2019000945 A1 | 1/2019 |

* cited by examiner

*Primary Examiner* — James M Anderson, II
(74) *Attorney, Agent, or Firm* — Frank A. MacKenzie; Bejin Bieneman PLC

(57) ABSTRACT

A system, including a processor and a memory, the memory including instructions to be executed by the processor to determine camera calibration parameters including camera focal distance, camera height and camera tilt based on a two-dimensional calibration pattern located parallel to and coincident with a ground plane determined by a roadway surface and determine object data including object location, object speed and object direction for one or more objects in a field of view of the video camera.

20 Claims, 12 Drawing Sheets

TRAFFIC CAMERA CALIBRATION

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
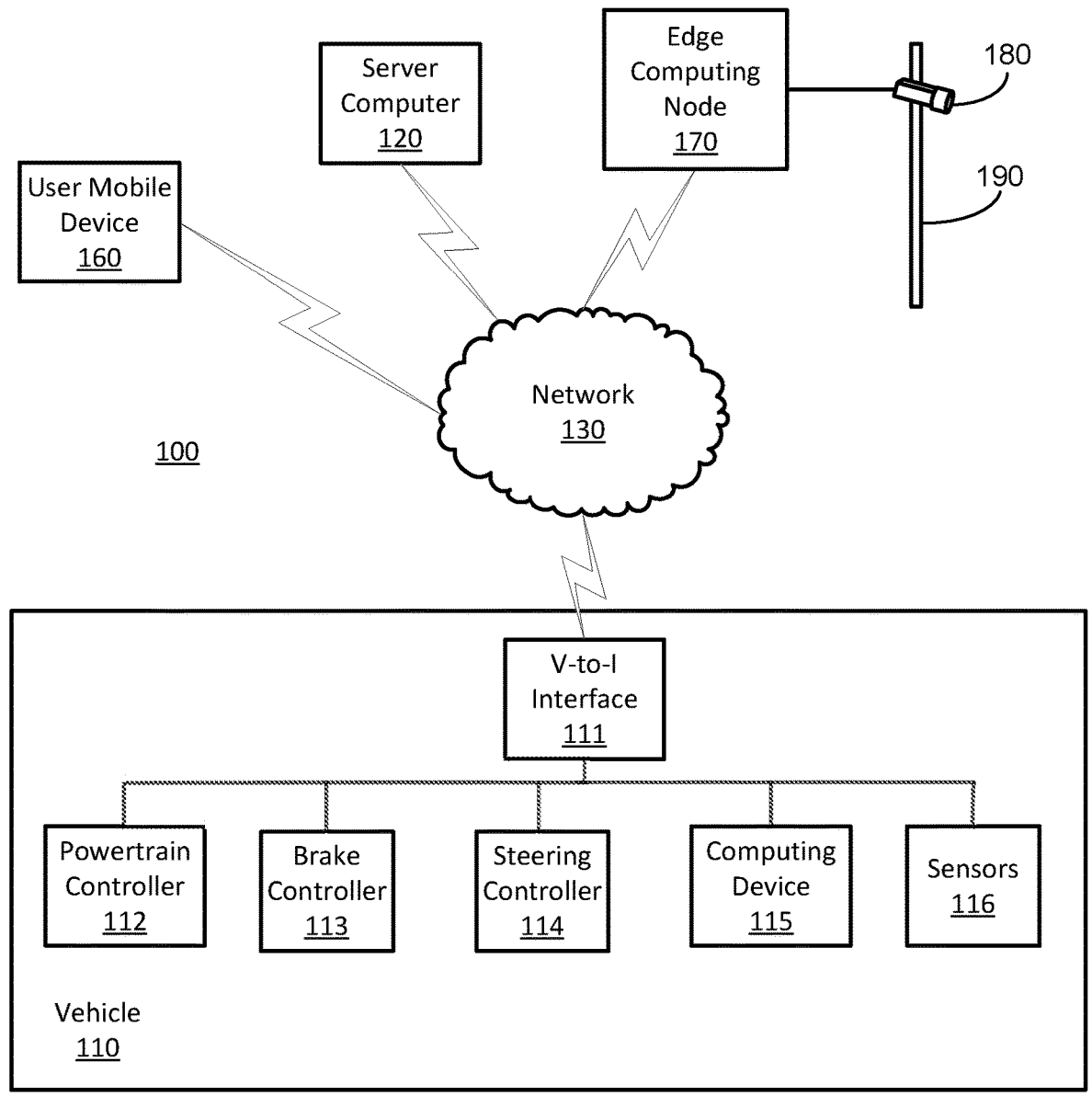
FIG. 1 is a diagram of an example traffic infrastructure system.

A computer in a traffic infrastructure system can be programmed to acquire data regarding traffic and to use the data to operate one or more vehicles in autonomous or semi-autonomous mode. For example, a computer in a traffic infrastructure system can be programmed to acquire data regarding the location, direction, and speed of vehicles on a roadway. A traffic infrastructure system can acquire data from a variety of sensor modalities to determine the real-world location, direction, and speed of objects, including vehicles. For example, a traffic infrastructure system can acquire data from doppler radar regarding the location, direction and speed of objects. A traffic infrastructure system can also acquire point cloud data from lidar sensors. The point cloud data can be processed to determine the location of objects and doppler data or a time series of point cloud data can be processed to yield direction and speed for the objects. Time series stereo image data can be processed to yield location, direction, and speed for objects in a field of view of the stereo cameras. Time series data can be obtained from stereo video cameras.

Techniques discussed herein improve upon radar, lidar, and stereo camera techniques for determining data regarding objects in traffic by determining the real-world location of objects using a single camera. Techniques discussed herein can determine real-world locations of objects using a single image sensor that costs less, in terms of both money and computational resources, than two stereo image sensors, less than a radar sensor and much, much less than a lidar sensor. Moreover, techniques discussed herein can determine an object location with much higher resolution than radar sensors. Radar sensor typically require correlation with other sensor modalities, such as cameras, to determine object location. Stereo image sensors depend upon two cameras at separate locations maintaining precise orientation to provide accurate data. Lidar sensors can cost hundreds of times more than cameras and are computationally very expensive. Techniques discussed herein can use a single video camera to acquire time series data that can be processed to determine real-world location, direction, and speed of objects in traffic for less cost using fewer computing resources than other techniques.

Disclosed herein is a method, including determining camera calibration parameters for a camera including camera focal distance, camera height and camera tilt based on a two-dimensional calibration pattern located parallel to and coincident with a ground plane determined by a roadway surface and determining object data including object location, object speed and object direction for one or more objects in a field of view of the camera. A ground plane can be determined by fitting a plane to real-world locations of points measured on the roadway surface in the field of view of the camera. Distances to objects from a camera as measured on the roadway surface can be based on the calibration parameters. The camera calibration parameters can transform pixel data into real-world coordinates. The camera focal distance can be determined by determining a distance between an optical center of the camera and a camera sensor plane by processing an image of the two-dimensional calibration pattern. The camera height can be determined by determining a distance between the optical center of the camera and a ground plane by processing the image of the two-dimensional calibration pattern.

The camera tilt can be determined by determining a distance between the optical center of the camera and a vanishing line determined by connecting two or more vanishing points determined by processing the image of the two-dimensional calibration pattern, wherein the vanishing points are locations in the image where parallel lines in the two-dimensional calibration pattern meet due to perspective distortion. The object speed and the object direction can be determined by determining the object location in a time series of video frames. The object data can be downloaded to a vehicle. The camera can be included in a traffic infrastructure system. The camera can be a stationary video camera. The camera calibration parameters can be calculated based on intrinsic and extrinsic camera parameters determined by processing an image of the two-dimensional calibration pattern. The intrinsic camera parameters can include focal distances in the x and y directions. The extrinsic camera parameters can include a translation matrix and a rotation matrix that determine the translation and rotation from the two-dimensional calibration pattern to the camera optical center.

Further disclosed is a computer readable medium, storing program instructions for executing some or all of the above method steps. Further disclosed is a computer programmed for executing some or all of the above method steps, including a computer apparatus, programmed to determine camera calibration parameters for a camera including camera focal distance, camera height and camera tilt based on a two-dimensional calibration pattern located parallel to and coincident with a ground plane determined by a roadway surface and determine object data including object location, object speed and object direction for one or more objects in a field of view of the camera. Distances to objects from a camera as measured on the roadway surface can be based on the calibration parameters. A ground plane can be determined by fitting a plane to real-world locations of points measured on the roadway surface in the field of view of the camera. The camera calibration parameters can transform pixel data into real-world coordinates. The camera focal distance can be determined by determining a distance between an optical center of the camera and a camera sensor plane by processing an image of the two-dimensional calibration pattern. The camera height can be determined by determining a distance between the optical center of the camera and a ground plane by processing the image of the two-dimensional calibration pattern.

The instructions can include further instructions to determine camera tilt by determining a distance between the optical center of the camera and a vanishing line determined by connecting two or more vanishing points determined by processing the image of the two-dimensional calibration pattern, wherein the vanishing points are locations in the image where parallel lines in the two-dimensional calibration pattern meet due to perspective distortion. The object speed and the object direction can be determined by determining the object location in a time series of video frames. The object data can be downloaded to a vehicle. The camera can be included in a traffic infrastructure system. The camera can be a stationary video camera. The camera calibration parameters can be calculated based on intrinsic and extrinsic camera parameters determined by processing an image of the two-dimensional calibration pattern. The intrinsic camera parameters can include focal distances in the x and y directions. The extrinsic camera parameters can include a translation matrix and a rotation matrix that determine the translation and rotation from the two-dimensional calibration pattern to the camera optical center.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Traffic infrastructure system 100 can include one or more edge computing nodes 170, where an edge computing node 170 is one or more computing devices 115 that acquires sensor data, for example from a camera 180, and communicates with vehicles 110 via a V-to-I interface or the like in a local portion of one or more of a roadway, parking lot or parking structure, etc. It is advantageous for an edge computing node 170 to be geographically close (i.e. less than one kilometer, for example) to the vehicles 110 and cameras 180 it communicates with to prevent communication lag. Communication lag is a time delay in messages sent between an edge computing node 170 and a vehicle 110 or a camera 180. A time delay of greater than a few (1-10) hundred milliseconds per message can result in unacceptable performance of an edge computing node 170 and can be prevented by placing the edge computing node 170 in geographic proximity to cameras 180 and vehicles 110. An edge computing node 170 can also be connected with cameras 180 and vehicles 110 via a dedicated wireless network that guarantees acceptable communication lag regardless of where the edge computing node 170 is physically located. A dedicated wireless network is a wireless network in which access is limited to preserve network bandwidth for permitted users.

For example, camera 180 can be a stationary video camera attached to a pole 190, building, or other structure to give the camera 180 a view of traffic. Mobile sensors such as a camera 180 can alternatively or additionally be mounted on aerial drones or other mobile platforms to provide views of traffic from positions not available to stationary sensors. Edge computing nodes 170 further can be in communication with computing devices 115 in vehicle 110, server computers 120, and user mobile devices 160 such as smart phones. Server computers 120 can be cloud-based computer resources that can be called upon by edge computing nodes 170 to provide additional computing resources when needed.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
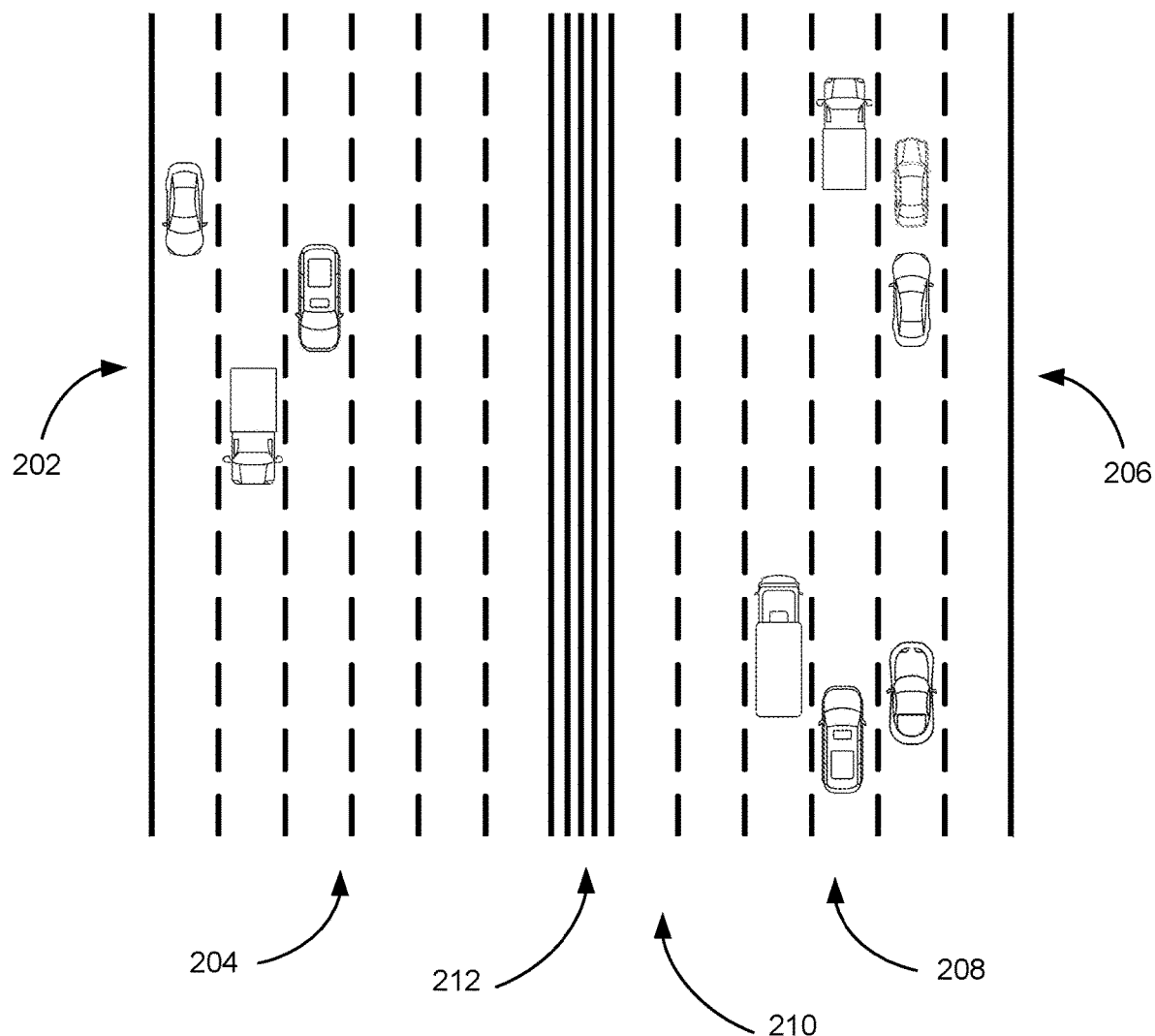
FIG. 2 is a diagram of a top-down view of a real-world traffic scene.

FIG. 2 is a diagram of a traffic scene 200. Traffic scene 200 is viewed from above and includes first vehicles 202 traveling in traffic lanes 204 in a first direction and second vehicles 206 traveling in traffic lanes 208 in a second direction on a roadway 210. Traffic lanes 204 and 206 are separated by a median 212.

Figure 3:
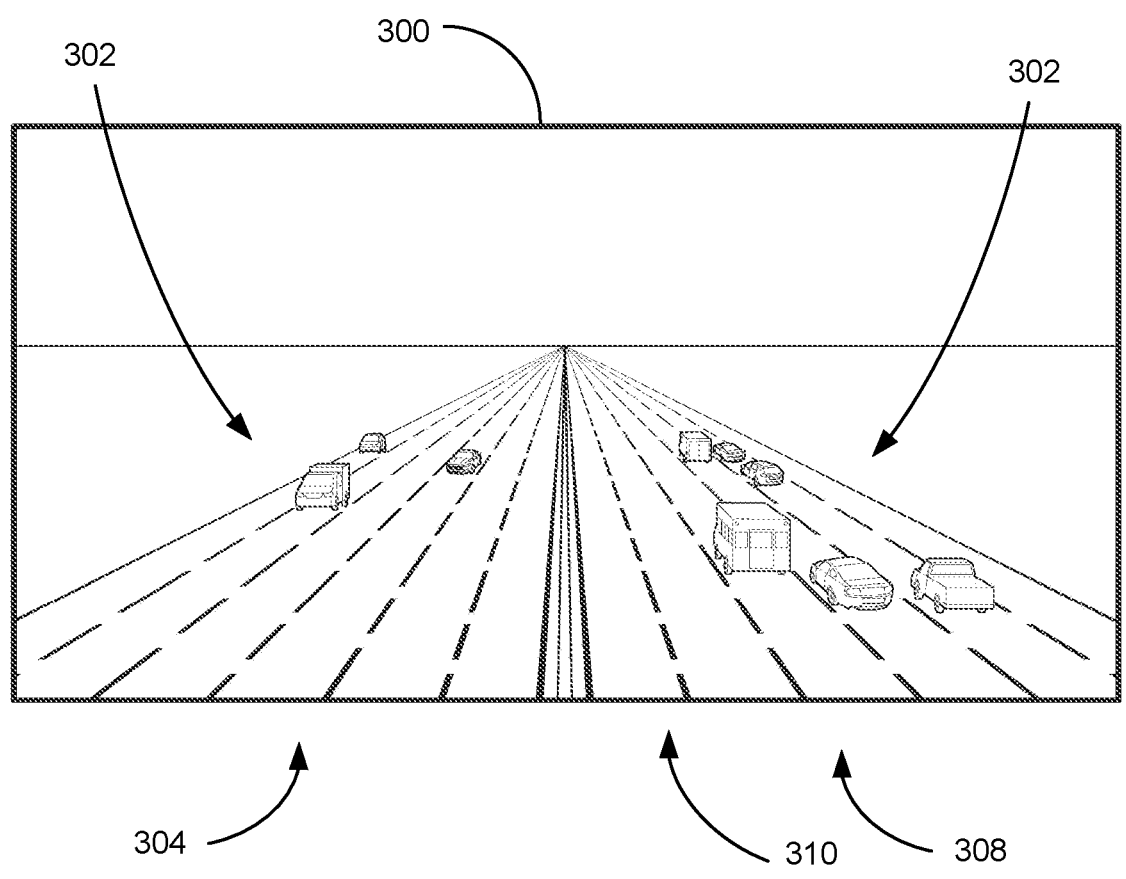
FIG. 3 is a diagram of an image of a traffic scene viewed by a camera.

FIG. 3 is a diagram of an image 300 of the traffic scene 200 from FIG. 2. An image 300 of a real-world traffic scene 200 can be captured by a camera 180 included in a traffic infrastructure system 100. The image 300 includes images of first vehicles 302 in a first lane 304 and second vehicles 306 on a second lane 308, both included in a roadway 310. The camera 180 can be a video camera can be that acquires a plurality of video images or frames in a time series. The video camera can acquire video frames at a rate of 60 frames per second, for example. The video camera can acquire color image data, where each frame of image data is encoded as three frames of red, blue and green (RGB) data that can be combined to generate a color image.

Figure 4:
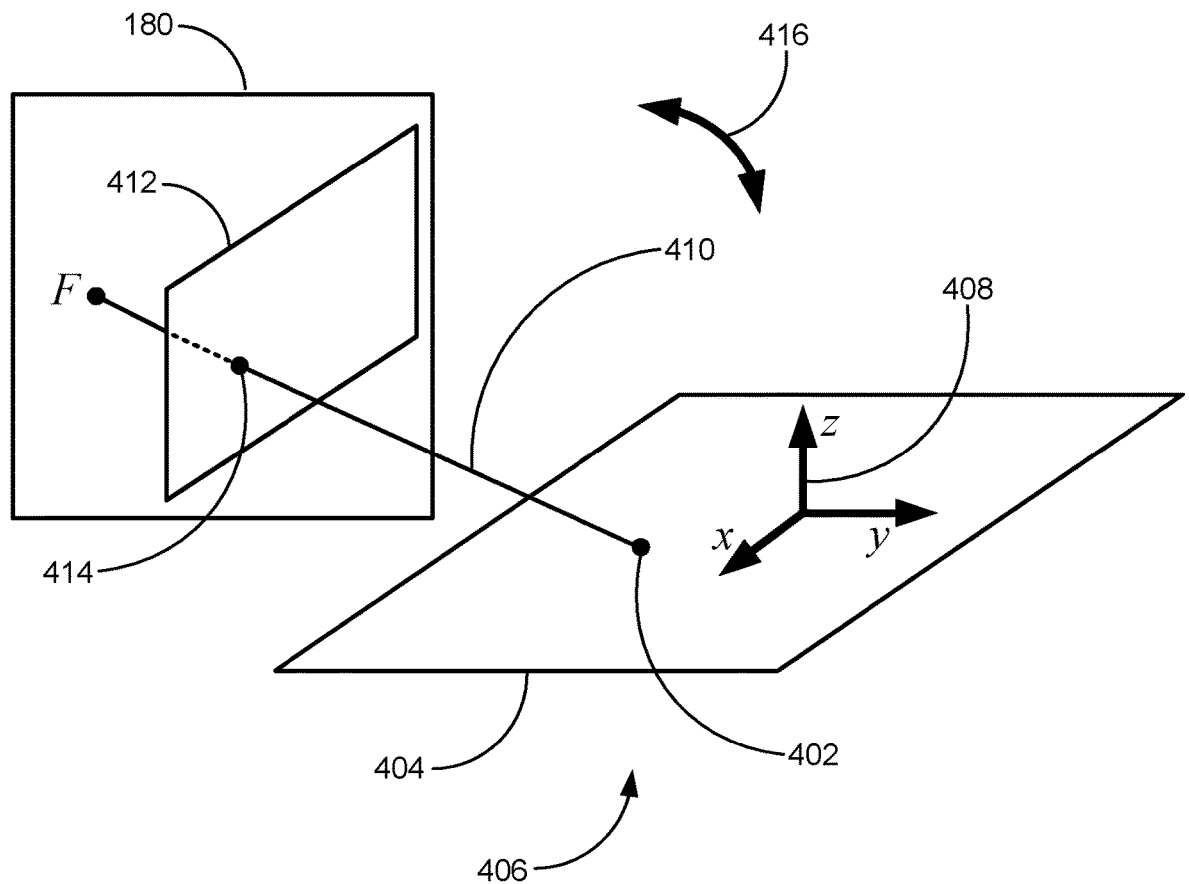
FIG. 4 is a diagram of a camera.

FIG. 4 is a diagram of a camera 180. In FIG. 4, a point 402 on or near a ground plane 404 in a real-world scene 406 can reflect or emit a ray of light 408 that is acquired by camera 180. The ground plane 404 can correspond to a roadway 310 in a real-world scene 406, for example, and can be described by real-world coordinates 410. The ground plane 404 can be determined by measuring the three-dimensional locations of points on a roadway 310 and fitting a plane to the points. The ground plane 404 can be fit to the points using a least-squares algorithm, for example. A least-squares algorithm minimizes the differences between the real-world locations of points and the location of the ground plane 404. The real-world coordinates 410 can describe the location and orientation of a ground plane 404 and a point 402 in six axes, namely three x, y, and z location axes and three roll, pitch, and yaw rotations about the three location axes, respectively. The camera 180 images one or more rays of light 408 from one or more points 402 onto an image sensor 412 to create pixel data at a pixel location 414 on the image sensor 412. The image sensor 412 converts rays of light 408 to electrical signals and then digital values at pixel locations to create an image 300.

A camera 180 typically images rays of light 408 onto the image sensor 412 via a lens. The process by which a lens images a ray of light 408 onto an image sensor 412 can be simplified by assuming that all of the rays of light 408 pass through a pinhole which replaces the lens. Such pinhole geometry can be further simplified by assuming that the rays of light 408 all pass through the image sensor 412 to meet at an optical center of the lens C behind the image sensor 412. In this fashion a camera 180 generates an image 300 of a real-world scene 406 by creating pixel data at pixel locations 414 based on the real-world coordinates 410 of points 402 and the optical center C of camera 180.

Figure 5:
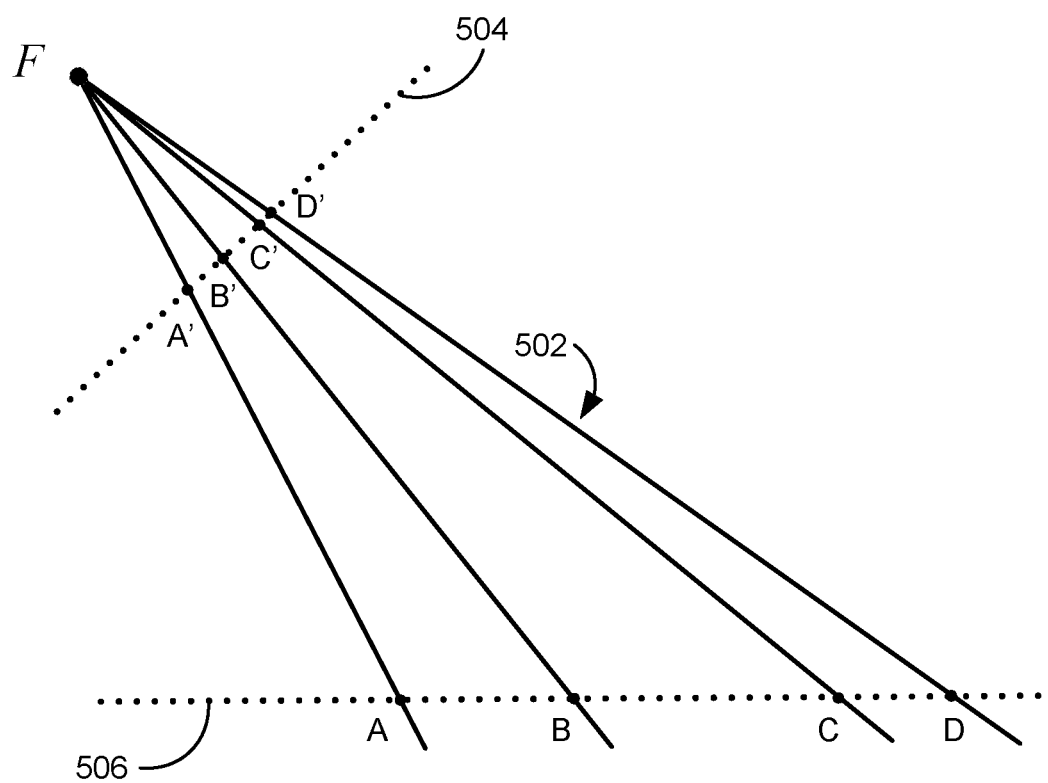
FIG. 5 is a diagram of cross-ratio invariance.

FIG. 5 is a diagram of cross-ratio invariance. Cross-ratio invariance is a property of an optical system such as a camera 180 that can be modeled using pinhole optics as demonstrated in FIG. 4. Bisecting any four straight lines 502 that meet at an optical center C with two straight lines 504, 506 forms two sets of colinear points (A, B, C, D) and (A', B', C', D'). Cross-ratio invariance means that a ratio of distances between the points, denoted as (AC), (BC), (AD) and (A' C'), (B' C'), (A' D') are invariant regardless of the locations of lines 504, 506 with respect to the optical center C. Cross-ratio invariance is expressed by the equation:

$$\frac{(AC)(BC)}{(BC)(AD)} = \frac{(A'C')(B'C')}{(B'C')(A'D')} \quad (1)$$

In this example, line 506 can be a ground plane 404 corresponding to a roadway and line 504 can be an image sensor 412 and C is the optical center of a camera 180.

Cross-ratio invariance can be used to determine distances to objects in image data. For example, assume that (A, B, C, D) are pixel locations in an image. Distances (AC), (BC), (AD) can be determined by measuring Euclidian distances between pixels in an image 300. Assume also that distances (A'B') and (C' D') are determined by physically measuring distances on a roadway corresponding to a ground plane 404 in real-world coordinates. These distances can correspond to any features of the roadway that will occur in an image. Assume that a distance (B' C')=W is the unknown quantity to be determined. This unknown quantity can be the location of an object on a roadway to be determined. Substituting for the unknown quantity in equation (1) yields an algebraic equation:

$$\frac{(AC)(BC)}{(BC)(AD)} = \frac{(A'B'+W)(W+C'D')}{W((A'B')+W+(C'D'))} \quad (2)$$

This equation can be solved for W in terms of measured quantities (AC), (BC), (AD) and (A' B'), (C' D') thereby determining the distance W in real-world coordinates.

Figure 6:
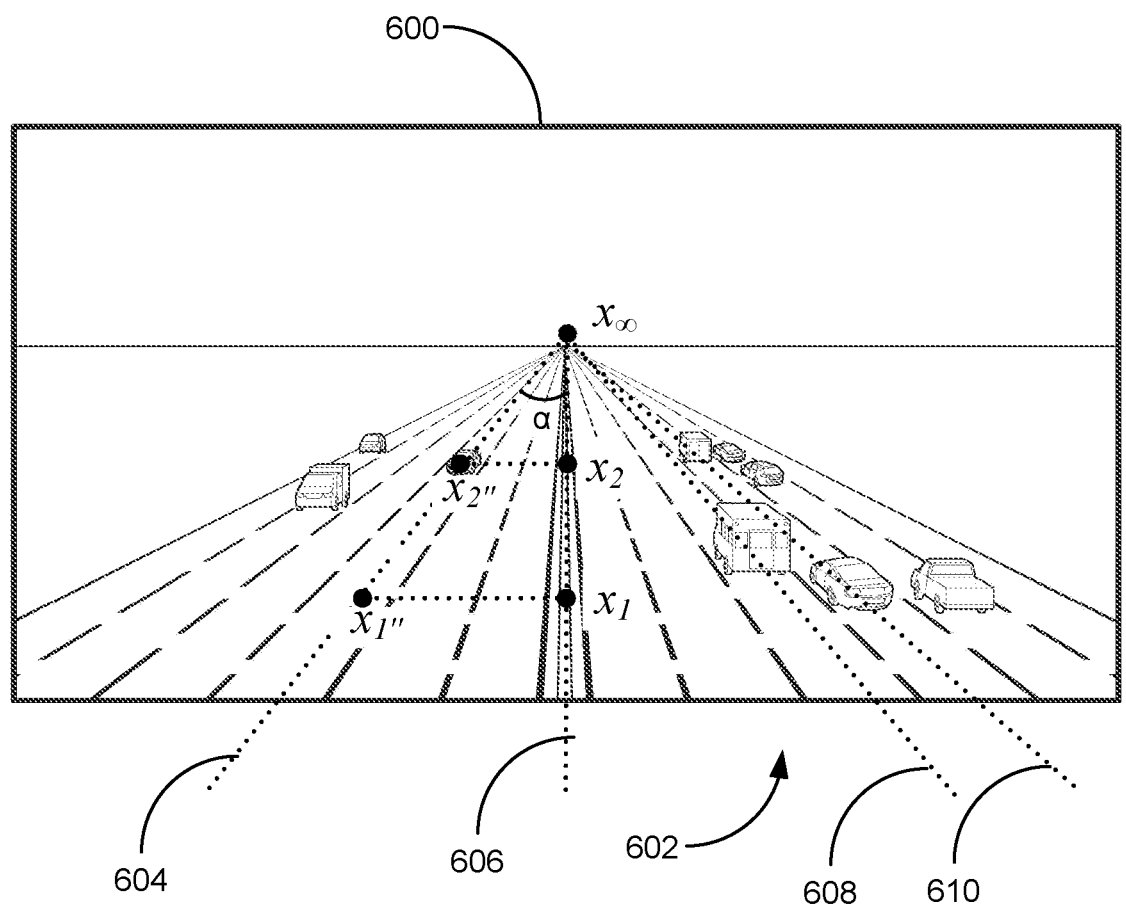
FIG. 6 is a diagram of cross-ratio invariance applied to traffic data.

FIG. 6 is a diagram of traffic data analysis using cross-ratio invariance on an image 600 of a traffic scene including a roadway 602. Traffic flow analysis begins by determining a vanishing point $x_\infty$ in the image 600. Vanishing point $x_\infty$ can be determined by constructing a series of lines 604, 606, 608, 610 (dotted lines) along features known to be parallel in the real-world, i.e. traffic lanes on roadway 602. The vanishing point $x_\infty$ is the point where the lines 604, 606, 608, 610 meet due to perspective distortion in the image 600. Assume the problem is to determine a distance $d_{x_1,x_2}$ between points $x_1$ and $x_2$ in image 600 in real-world coordinates. The problem can be solved by expressing the distance $d_{x_1,x_2}$ as a cross-ratio invariance equation as will be shown in relation to FIG. 7, below.

Figure 7:
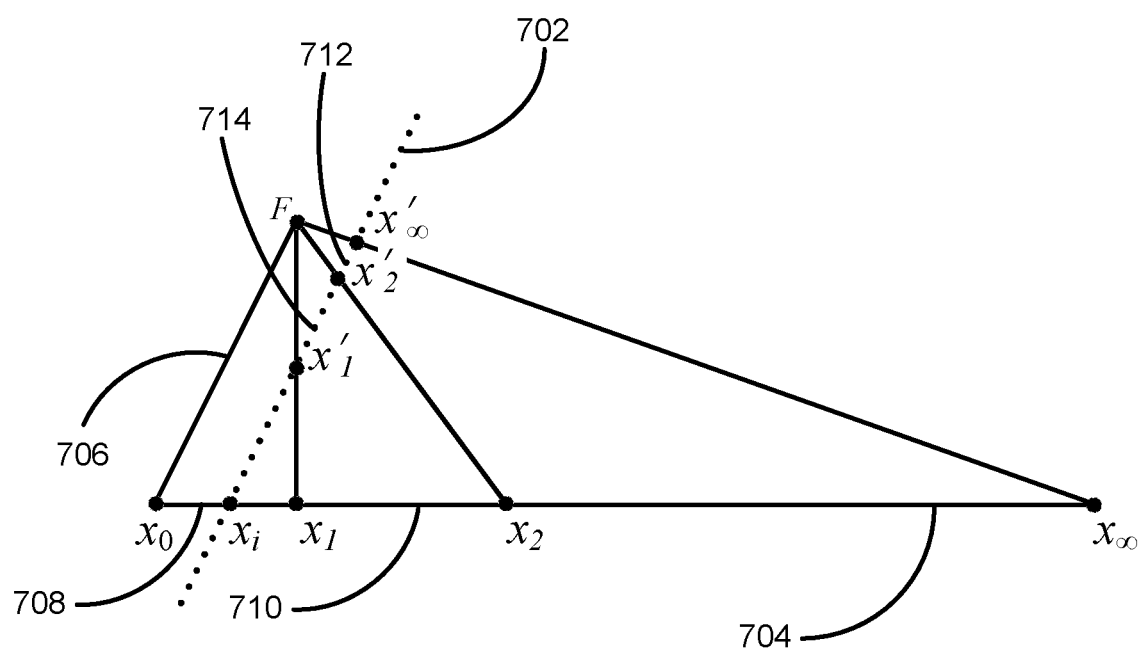
FIG. 7 is another diagram of cross-ratio invariance applied to traffic data.

FIG. 7 is a diagram of traffic data analysis using cross-ratio invariance 700 that illustrates the process by looking at a plane through line 606 of FIG. 6 perpendicular to the roadway 602. The diagram of traffic data analysis using cross-ratio invariance 700 includes an image sensor plane 702 and a ground plane 704 corresponding to roadway 602. Image sensor plane 702 is a plane corresponding to the location of the image sensor 412 from FIG. 4. Points $x_1$, $x_2$, and $x_\infty$ from image 600 from FIG. 6 are included on ground plane 704. Also include on ground plane 704 are point $x_0$, which is the projection of the optical center F onto the ground plane 704 parallel to the image sensor plane 702 and point $x_i$, which is the projection of the image sensor plane 702 onto the ground plane 704.

Intersections of the image sensor plane 702 with the lines connecting the optical center F with points $x_1$, $x_2$, and $x_\infty$ form points $x_1'$, $x_2'$, and $x_\infty'$, respectively. $d_{F,x_0}$ is the length of line segment 706 from the optical center F to the point $x_0$, measured in real-world coordinates, for example meters. $d_{x_0,x_i}$ is the length of the line segment 708 from point $x_0$ to the point $x_i$, real-world coordinates, for example meters. $d_{x_1,x_2}$ is the length of the line segment 710 from point $x_1$ to point $x_2$, measured in real-world coordinates, for example meters. $d_{x'_\infty,x'_2}$ is the length of the line segment 712 from point $x_\infty'$ to point $x_2'$ in the image sensor plane 702, measured in pixels. $d_{x'_\infty,x'_1}$ is the length of the line segment 712 from point $x_\infty'$ to point $x_1'$ in the image sensor plane 702, measured in pixels. Applying cross-ration invariance to these variables to determine the distance $d_{x_1,x_2}$ yields the equation:

$$d_{x_1,x_2} = \frac{m d_{F,x_0} d_{x_0,x_i}}{d_{x'_\infty,x'_2}} - \frac{m d_{F,x_0} d_{x_0,x_i}}{d_{x'_\infty,x'_1}} \quad (2)$$

Where m is the number of pixels per unit distance, in this example pixels/meter. The value m is camera dependent and is based on the magnification of the lens. Equation (2) can be re-written by recognizing that the value $m d_{F,x_0} d_{x_0,x_i} = C$ is constant for a given camera at a fixed height and orientation to a ground plane 704:

$$d_{x_1,x_2} = \frac{C}{d_{x'_\infty,x'_2}} - \frac{C}{d_{x'_\infty,x'_1}} \quad (3)$$

In examples where a line segment in ground plane 704 is not perpendicular to the image sensor plane 702, for example line 604 in FIG. 6, equation (3) is modified to be:

$$d_{x_1,x_2} = \frac{C}{d_{x'_\infty,x''_2}\cos(\alpha_{x'_\infty,x''_2})} - \frac{C}{d_{x'_\infty,x''_1}\cos(\alpha_{x'_\infty,x''_1})} \quad (4)$$

Where $x_1''$ and $x_2''$ are points on line 604 from FIG. 6 and $\alpha$ is the angle between lines 604 and 606 in FIG. 6. The constant C can be determined by first making multiple real-world measurements of distances between points in the traffic scene corresponding to an image 600 to determine ground truth on a plurality of lines 604, 606, 608, 610. Ground truth is defined as a value determined independently from the calculation being performed, in this case physically making a real-world measurement.

The constant C can then be determined by calculating the minimum value of C that satisfies the following equation for n ground truth line segments:

$$C = \operatorname{argmin} \sum_{i=1}^{n} \left( \left| \frac{C}{d_{i,x'_\infty,x''_2}\cos(\alpha_{i,x'_\infty,x''_2})} - \frac{C}{d_{i,x'_\infty,x''_1}\cos(\alpha_{i,x'_\infty,x''_1})} \right| - d_i \right)^2 \quad (5)$$

Where $d_i$ is the length of the $i^{th}$ ground truth line segment in meters, $d_{i,x'_\infty,x''_2}$ is the length of a line segment from the vanishing point $x_\infty'$ to point $x_2''$ measured in pixels, $d_{i,x'_\infty,x''_1}$ is the length of a line segment from the vanishing point $x_\infty'$ to point $x_1''$ measured in pixels, $\alpha_{i,x'_\infty,x''_2}$ is the angle between a vertical line segment 606 and the $i^{th}$ line segment from the vanishing point $x_\infty'$ to a point $x_2''$ measured in the image 600, and $\alpha_{i,x'_\infty,x''_1}$ is the angle between a vertical line segment 606 and the $i^{th}$ line segment from the vanishing point $x_\infty'$ to a point $x_1''$ measured in the image 600.

Figure 8:
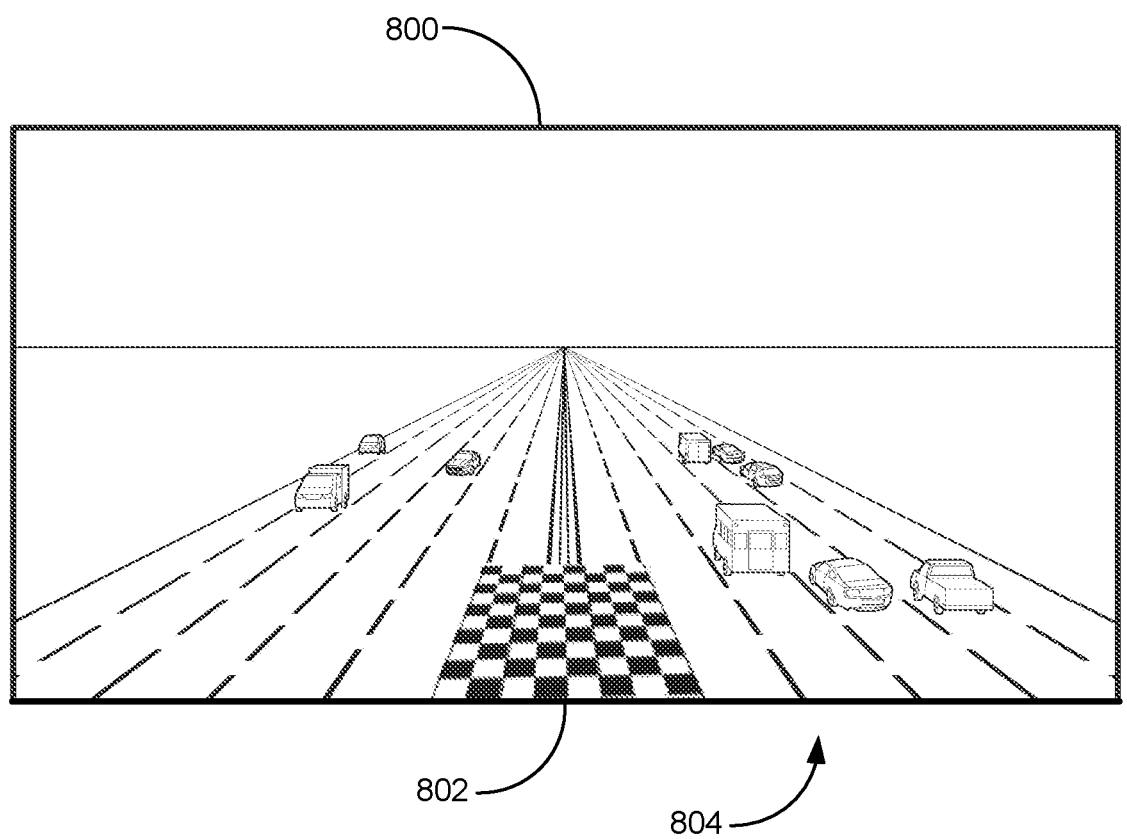
FIG. 8 is a diagram of a calibration pattern.

FIG. 8 is a diagram of an image 800 that includes a calibration pattern 802. A calibration pattern is a visual pattern such as a two-dimensional checkerboard pattern of alternating black and white squares, typically applied to a thin, flat, typically square substrate made of wood, plastic, metal or thick cardboard. The high-contrast pattern can be printed or painted on the substrate. Techniques discussed herein improve upon this technique for determining the constant C by acquiring an image 800 of a calibration pattern 802 and processing the image as described in relation to FIGS. 9-11, below. An image of the calibration pattern 802 can be used to determine camera intrinsic parameters such as focal distance and camera extrinsic parameters such as camera height and camera tilt. Camera intrinsic and camera extrinsic parameters can be determined by inputting an image of a calibration pattern 802 into a camera calibration application, an application in MatLab, in one example. MatLab is a collection of software programs that calculate mathematical and machine vision tasks produced by MathWorks, Natick, Mass. 01760.

The MatLab camera calibration application that calculates camera intrinsic and extrinsic parameters based on an input image of a checkerboard calibration pattern 802. The MatLab camera calibration application can assume a pinhole model for the camera to be calibrated. The camera intrinsic parameters include focal distances in the x and y directions and a location of an optical center F, both calculated with respect to an image sensor 412. The camera extrinsic parameters include rotation and translation matrices that transform points on the calibration pattern 802 measured in world coordinates into camera coordinates. The camera intrinsic parameters are then used to transform the points in camera coordinates onto the image sensor 412 to form an image.

Calibration pattern 802 is a checkerboard pattern of equally-sized alternating black and white squares. The size of the squares in the calibration pattern 802 are measured to permit the real-world size of the squares to be input to the MatLab camera calibration application. The real-world size of a pixel in both the x and y directions are input to the MatLab camera calibration program to permit translations between real-world measurements and pixel measurements. The real-world size of a pixel can be determined by dividing the real-world size of the sensor in the x and y directions by the number of pixels in each direction. These values are available from the manufacturer of the image sensor. The calibration pattern 802 is arranged to be parallel to a ground plane corresponding to a roadway 804. If the calibration pattern 802 is not located on the roadway 804, the distance from the calibration pattern 802 to the roadway 804 can be measured to determine the location of a ground plane corresponding to the roadway 804 in image 800.

The camera focal distance $f_p$ can be determined directly from the intrinsic camera parameters output from the MatLab camera calibration application. In response to inputting an image 800 that includes a calibration pattern 802 along with parameters that specify the size of the calibration pattern 802, the MatLab camera calibration application outputs a transposed 3×3 (three-by-three) intrinsic camera calibration parameter matrix, $K^T$:

$$K^T = \begin{bmatrix} f_x & 0 & 0 \\ s & f_y & 0 \\ c_x & c_y & 1 \end{bmatrix} \quad (6)$$

Where $f_x$ is the focal distance in pixels in the x direction with respect to the image sensor 412, $f_y$ is the focal distance in pixels in the y direction with respect to the image sensor 412, $c_x$ and $c_y$ are the location of the optical center F in the x and y directions, respectively, measured in pixels and s is the skew coefficient which measures any deviation from a rectangle by the image sensor 412, i.e., a deviation exists if the image sensor 412 x and y axes are not perpendicular. The focal distance $f_p$ can be determined from the intrinsic camera calibration parameters (6) output from the MatLab camera calibration application by averaging the $f_x$ and $f_y$ focal distance parameters:

$$f_p = \frac{f_x + f_y}{2} \quad (7)$$

Figure 9:
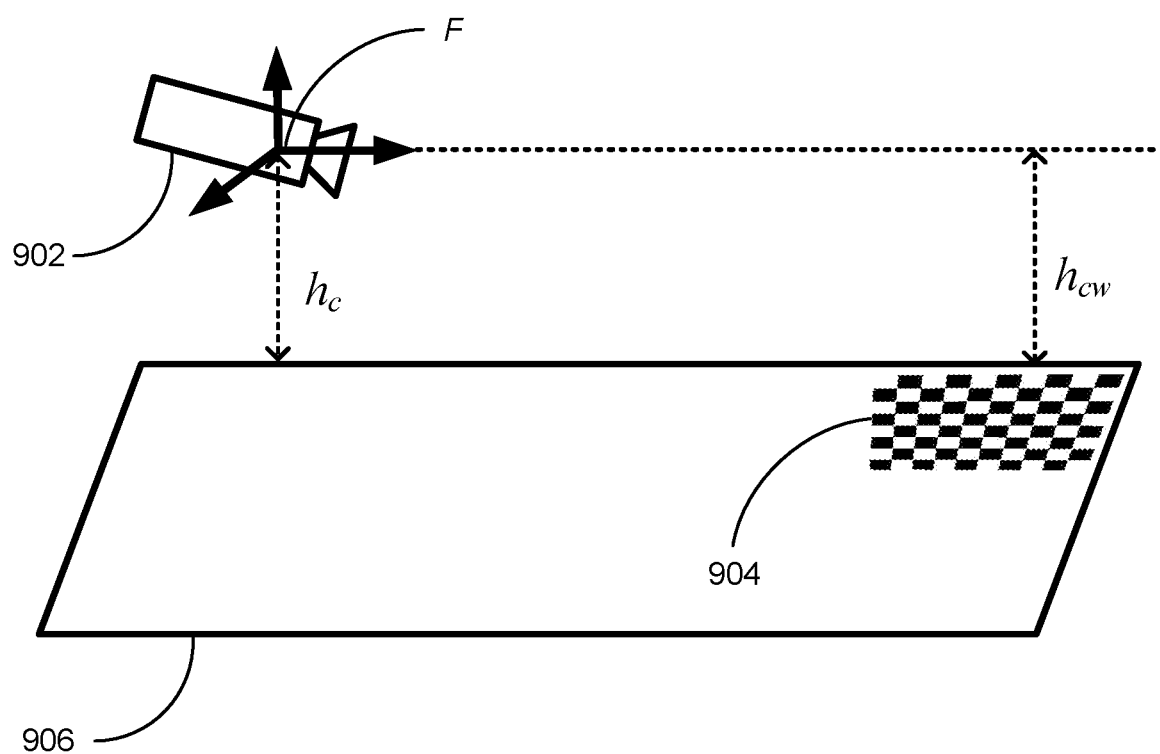
FIG. 9 is a diagram of camera height calibration.

FIG. 9 is a diagram of camera height calibration. Camera height $h_c$ can be determined from the camera extrinsic parameters output by the MatLab camera calibration application. The camera extrinsic parameters include two matrices $cam_{t_{wrld}}$ and $cam_{R_{wrld}}$. The 1×3 matrix $cam_{t_{wrld}}$ includes parameters that translate the x, y, and z real-world coordinates of the calibration pattern 904 to the optical center F of the camera 902. The 3×3 matrix $cam_{R_{wrld}}$ rotates the calibration pattern 802 to make it parallel to the image sensor 412. In general, the second term of the translation matrix $cam_{t_{wrld}}$ is the distance $h_c$ between the x-axis of the real-world coordinate system passing through the optical center F of camera 902 and the ground plane 906 upon which the calibration pattern 904 rests.

Determination of the camera height $h_c$ can be complicated by the ground plane 906 not being parallel to the x-axis of the real-world coordinate system passing through the optical center F of camera 902. The 3×3 matrix $cam_{R_{wrld}}$ can be used to compensate for tilt in the ground plane by calculating the x-axis tilt $O_x$ based on parameters $r_{32}$ and $r_{33}$ of the $cam_{R_{wrld}}$ using the equation:

$$\theta_x = a\tan 2(r_{32}, r_{33}) \quad (8)$$

Where the a tan 2 is a function that calculates the arc tangent of $r_{32}$, $r_{33}$, while determining the correct quadrant and thereby the correct sign with which to calculate the arc tangent. The x-axis tilt $\theta_x$ can be then used to compensate for the tilt by adding a value determined by multiplying the tangent of the x-axis tilt $\theta_x$ with the x-axis distance from the third parameter from the $cam_{t_{wrld}}$ matrix, which is the distance of the camera 902 from the calibration pattern 904 in the x direction, to the y-axis or second term from the $cam_{t_{wrld}}$ matrix to form a corrected $h_c$.

Figure 10:
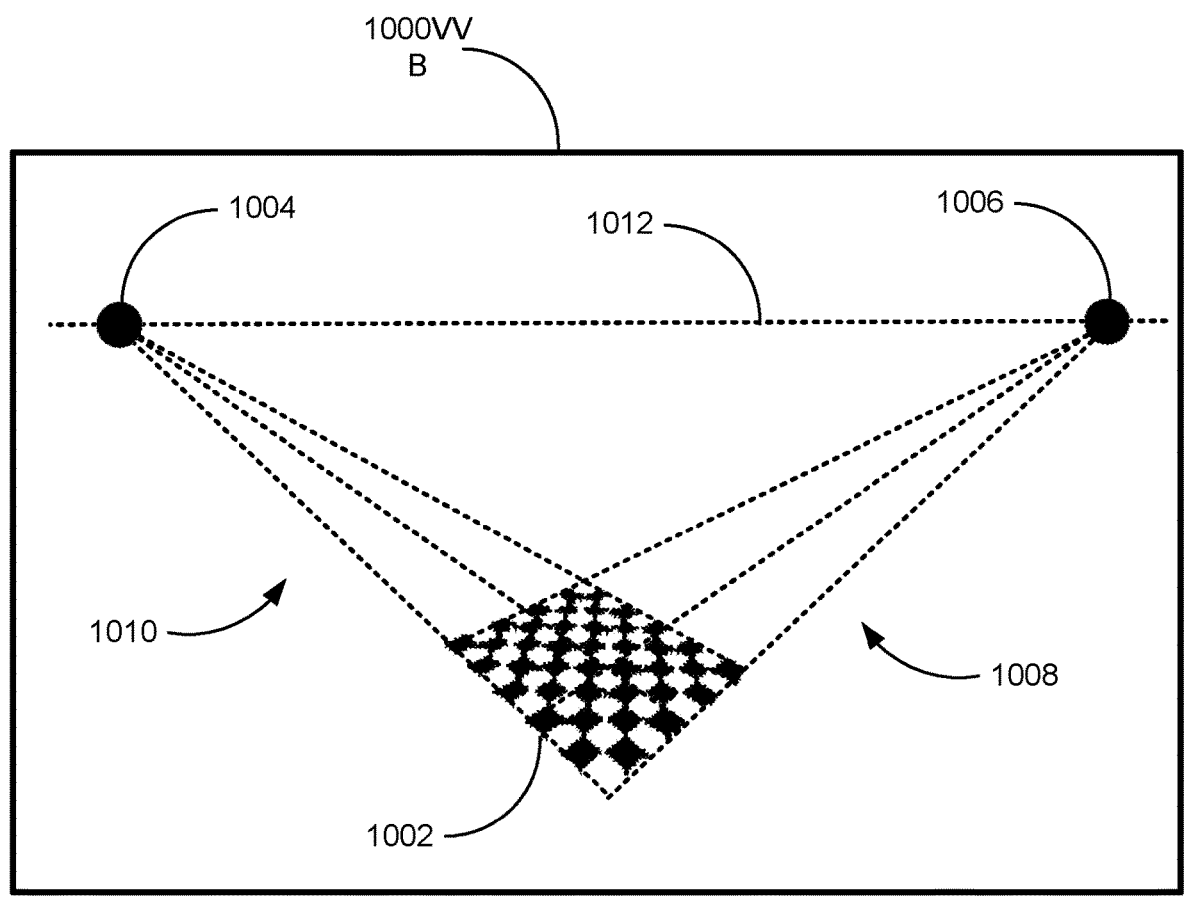
FIG. 10 is a diagram of camera tilt calibration.

FIG. 10 is a diagram of camera tilt calibration. Camera tilt β is the angle, measured in degrees, below horizontal, at which a camera is set or arranged in order to view a scene from above. Camera tilt calibration is performed by inputting an image 1000 of a calibration pattern 1002 and determining two or more vanishing points 1004, 1006 by extending sets of parallel lines 1008, 1010 until they meet at vanishing points 1004, 1006. Connecting the vanishing points 1004, 1006 generates a vanishing line 1012 or $V_{line}$ in image 1000. Camera tilt β can be determined by estimating a distance $d_{pp,V_{line}}$ in pixels between the optical center F of the camera, also referred to as the principle point and the vanishing line 1012. The focal distance $f_p$ and the distance between the principle point $P_p$ and a perpendicular to the vanishing line $V_{line}$ can be used to determine camera tilt β according to the equation:

$$\beta = \tan^{-1}\left(\frac{f_p}{d_{pp,V_{line}}}\right) \quad (9)$$

Camera tilt β can also be determined directly from the intrinsic and extrinsic camera parameters output from the MatLab camera calibration application. The MatLab camera calibration application outputs a 3×3 matrix of intrinsic camera parameters K, a 3×3 matrix of rotational extrinsic camera parameters R and a 1×3 vector of translation parameters T. A 1×4 vector of dimensionless parameters $P=[p_1\ p_2\ p_3\ p_4]$ can be formed by the equation:

$$P = K[R|T] = [p_1 p_2 p_3 p_4] \quad (10)$$

Which can be used to estimate the distance $d_{pp,V_{line}}$ between the principal point $P_p$ and the vanishing line $V_{line}$ according to the equation:

$$d_{pp,V_{line}} = \frac{(p_1 \times p_2)^T \cdot [P_p 1]}{\|P_p\|} \quad (11)$$

Once $d_{pp,V_{line}}$ is determined, equation (9) can be used to determine camera tilt β.

The camera calibration constant C can be determined directly based on camera focal distance $f_p$, camera height $h_c$, and camera tilt β all of which are output by the MatLab camera calibration application in response to inputting an image of a calibration pattern 802 as described above in relation to FIGS. 8-10 according to the following equation:

$$C = \frac{h_c f_p}{(\sin\beta)^2} \quad (12)$$

Determining the camera calibration constant C directly from camera 180 intrinsic and extrinsic parameters in this fashion improves determination of distances in image data by eliminating the need to perform multiple measurements of ground truth point locations in a traffic scene, determining and measuring the locations of the measured points in an image, measuring the locations of the ground truth points in an image and calculating equation (4). Techniques described herein can be performed more quickly and less expensively than previous techniques for determining the camera calibration constant C. Determining the camera calibration constant C in this fashion also requires fewer computing resources to obtain a value for C than acquiring and processing multiple images to find a minimum value for C.

Figure 11:
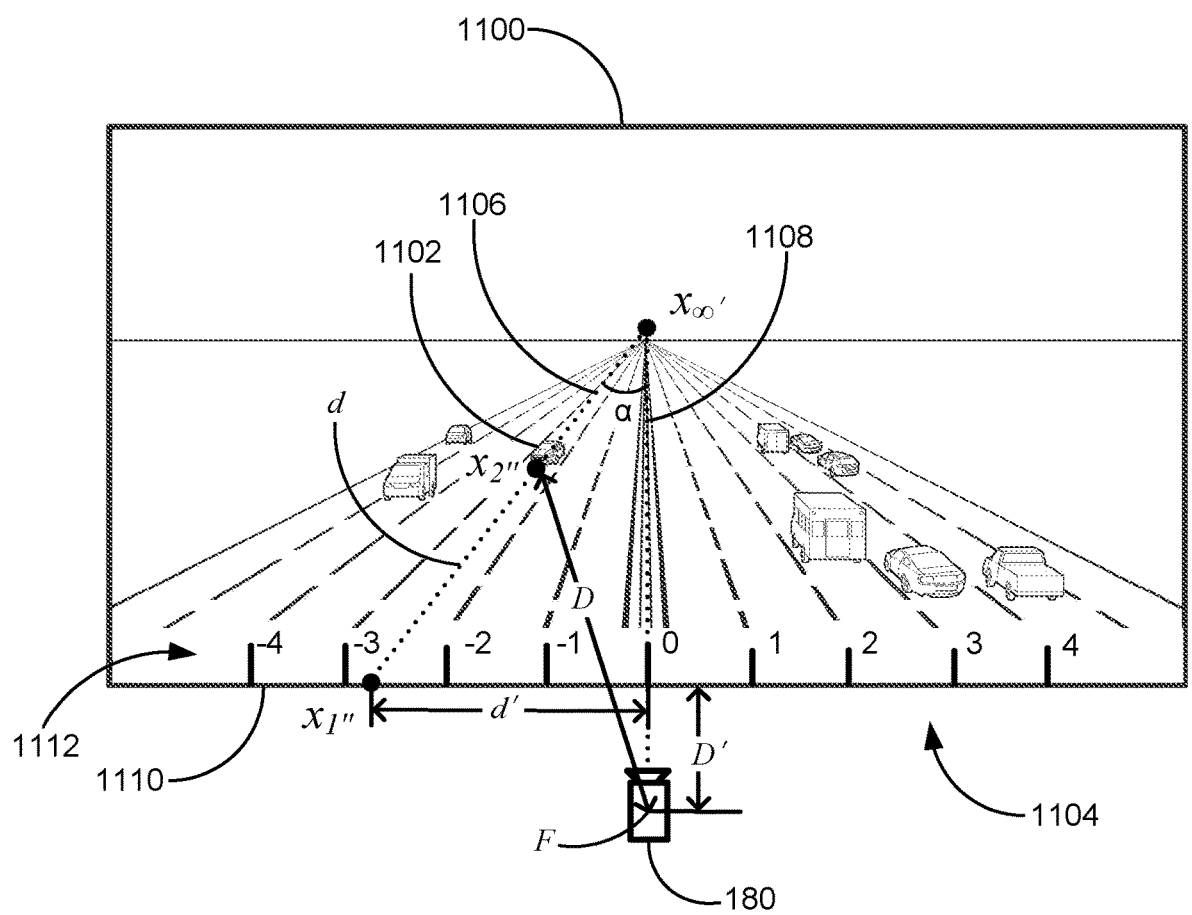
FIG. 11 is a diagram of cross-ratio invariance and camera calibration applied to traffic data.

FIG. 11 is a diagram of cross-ratio invariance and camera calibration processing applied to traffic data. An image 1100 is acquired by a camera 180 included in a traffic infrastructure system 100. Camera 180 is calibrated according to the techniques discussed in relation to FIGS. 8-10 to determine the camera calibration constant C. An image 1100 is acquired by camera 180 and communicated to an edge computing node 170 included in a traffic infrastructure system 100. Using techniques discussed herein, the edge computing node 170 can determine a distance d to an object 1102, for example a vehicle, on a roadway 1104 in a field of view of camera 180. By determining a series of distances d to an object 1102 in a time series of video frames, edge computing node 170 can determine a speed and direction for an object 1102 on a roadway 1104.

A distance d to an object 1102 can be determined using a version of equation (4), discussed above in relation to FIG. 7:

$$d = \frac{C}{d_{x'_\infty, x''_2}\cos(\alpha)} - \frac{C}{d_{x'_\infty, x''_1}\cos(\alpha)} \quad (13)$$

Where $d_{x'_\infty, x''_2}$ is the distance in pixels between the point $x_2''$ and the vanishing point $x_\infty'$ in image 1100, $d_{x'_\infty, x''_1}$ is the distance in pixels between the point $x_1''$ and the vanishing point $x_\infty'$ in image 1100, α is the angle between lines 1106 and 1108 in image 1100 and C is the camera calibration constant determined as discussed above in relation to FIGS. 8-10.

The distance d can be used to determine the distance between the optical center F of camera 180 and an object 1102 according to the equation:

$$D = \sqrt{(D'+d)^2 + d'^2} \quad (14)$$

Where D' is the distance between the optical center F of the camera 180 and a line 1110 corresponding to the bottom of image 1100. The distance D' can be measured at the time the camera 180 is installed. The distance d' is the distance between the line 1108 corresponding to the optical axis of camera 180 and the point $x_1''$ on line 1110. The optical axis of camera 180 is a line passing through both the center of the image sensor 412 and the optical center F. The distance D' can be measured at the time the camera 180 is installed.

The distance d' can be determined by interpolating between measuring fiducials 1112. Measuring fiducials 1112 are marks labeled with distances in real-world coordinates, for example meters. Measuring fiducials 1112 can be placed in the scene in the field of view of camera 180 by painting the marks and labels on the roadway 1104, for example. Measuring fiducials can also be virtual, where the measuring fiducials 1112 are inserted into the image 1100 by the edge computing node 170 calculating the distance D. The conversion between measured pixels and real-world coordinates for the distance d' can be determined by linear interpolation. Once the distance d' is determined in real-world coordinates, the distance D can be determined directly from equation (14).

Techniques discussed herein for determining a distance to an object 1102 improve existing techniques for determining distances to objects by using a single monocular camera 180, which can be a video camera. This contrasts with other techniques that require more complex and/or expensive sensors including stereo cameras, lidar or radar sensors. Techniques discussed herein reduce the computational resources and expense required to determine a camera calibration constant C by processing a single image of a calibration pattern 802, as opposed to processing a plurality of images with a plurality of measured ground truth distances. Finally, techniques discussed herein reduce the computational resources required to determine a distance D from a camera 180 to an object 1102 by using measuring fiducials 1112 to determine a distance d' on a line 1110 and thereby permit direction computation of distance D according to equation (14).

Figure 12:
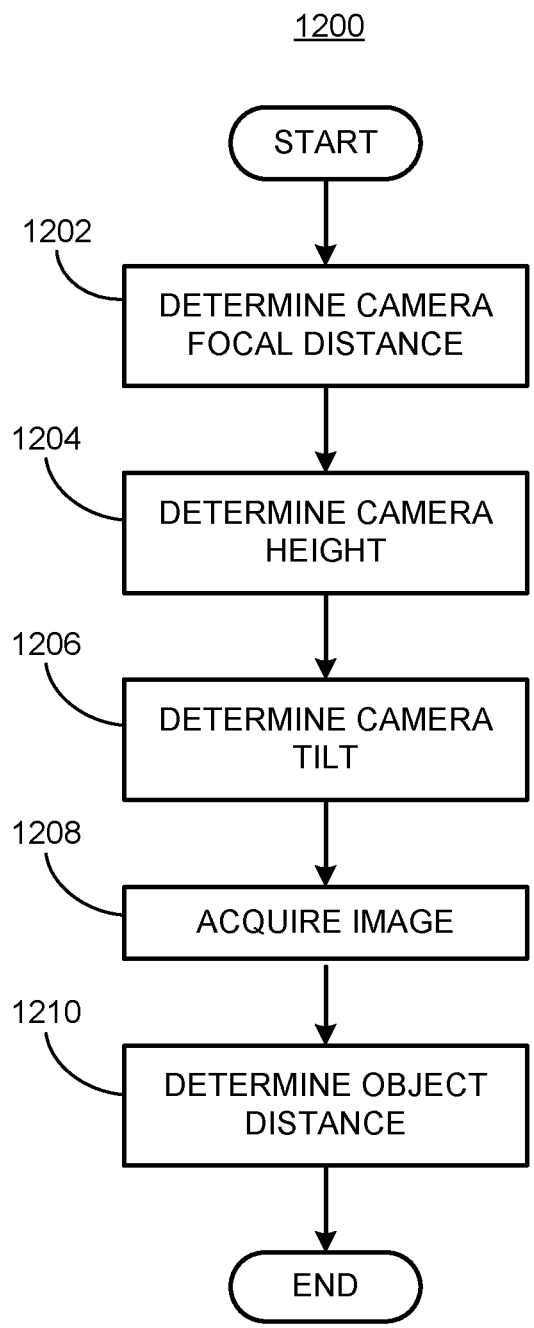
FIG. 12 is a flowchart diagram of an example process to determine cross-ratio invariance applied to traffic data.

FIG. 12 is a flowchart diagram of a process 1200 for determining a distance to an object. Process 1200 can be implemented by a processor of a computing device, taking as input data from sensors, and executing commands, and outputting object data, for example. Process 1200 includes multiple blocks that can be executed in the illustrated order. Process 1200 could alternatively or additionally include fewer blocks or can include the blocks executed in different orders.

Process 1200 begins at block 1202, where intrinsic camera parameters including camera focal distance $f_p$ are determined for a camera 180 by acquiring an image of a calibration pattern 802 and processing it in an edge computing node 170 of a traffic infrastructure system 100. The edge computing node 170 can determine the intrinsic camera parameters by processing the image of the calibration pattern 802 using the MatLab camera calibration application discussed above in relation to FIG. 8.

At block 1204 camera height $h_c$ for a camera 180 is determined by processing camera extrinsic parameters output by the MatLab camera calibration application as discussed above in relation to FIG. 9. Camera 180 is a stationary camera set to view a traffic scene from a "bird's eye view" position, where the camera looks down on a roadway 602, 1104 and can acquire images 600 that include objects including vehicles.

At block 1206 camera tilt $\beta$ is determined for a camera 180 set to view a traffic scene by processing camera extrinsic parameters output by the MatLab camera calibration application as discussed above in relation to FIG. 10. Camera tilt $\beta$ is the angle at which the camera 180 looks down upon the roadway 602, 1104.

At block 1208 a camera 180 acquires an image 1100 of a roadway 1104. The roadway image includes measuring fiducials 1112 coincident with the bottom edge of image 1100. The measuring fiducials 1112 are used to determine a distance d' between a line formed by the optical axis of camera 180 and a line 1106 between a vanishing point $x_\infty'$ and the point where the line 1106 intersects line 1110 as discussed above in relation to FIG. 11.

At block 1210 the edge computing node 170 determines a distance D from the camera 180 focal point F to an object 1102 on the roadway 1104 using cross-ratio invariance and camera calibration processing applied to traffic data. A camera calibration constant C is determined based on the focal distance $f_p$, the camera height $h_c$, and camera tilt $\beta$ according to equation (12). The camera calibration constant C is used to determine a distance d between points in image 1100 which can be processed using measuring fiducials 1112 and equation (14) as discussed above in relation to FIG. 11. As discussed above in relation to FIG. 11, a time series of distance D measurements can be determined by the edge computing node 170 and the time series of distance D measurements can be used to determine a direction and speed for an object 1102. The location, direction and speed data can be downloaded from the edge computing node 170 to a computing device 115 in a vehicle 110. The vehicle 110 can use the location, speed, and direction data to determine a vehicle path upon which to operate the vehicle 110. For example, computing device 115 can determine a vehicle path that avoids contact or near-contact with an object 1102 based on polynomial functions that maintain limits of lateral and longitudinal accelerations by the vehicle 110 while operating. Following block 1210 process 1200 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Computer 105 can be a computer 105 as described above or may include a dedicated electronic circuit including an ASIC that is manufactured for a particular operation, e.g., an ASIC for processing sensor data and/or communicating the sensor data. In another example, computer 140 may include an FPGA which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 105.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising a computing device including:
   a processor; and
   a memory, the memory including instructions executable by the processor to:
      determine camera calibration parameters for a camera including camera focal distance, camera height and camera tilt based on a two-dimensional calibration pattern located parallel to and coincident with a ground plane determined by a roadway surface; and
      determine object data including object location, object speed and object direction for one or more objects in a field of view of the camera including determining distances to objects as measured on the roadway surface in image data based on a vanishing point determined in the image data, measuring fiducials, and determining a camera calibration constant C based on the camera focal distance, the camera height, and the camera tilt.

2. The system of claim 1, the instructions including further instructions to determine a ground plane by fitting a plane to real-world locations of points measured on the roadway surface in the field of view of the camera.

3. The system of claim 1, wherein the camera calibration parameters transform pixel data into real-world coordinates.

4. The system of claim 1, the instructions including further instructions to determine the camera focal distance by determining a distance between an optical center of the camera and a camera sensor plane by processing an image of the two-dimensional calibration pattern.

5. The system of claim 4, the instructions including further instructions to determine the camera height by determining a distance between the optical center of the camera and a ground plane by processing the image of the two-dimensional calibration pattern.

6. The system of claim 5, the instructions including further instructions to determine the camera tilt by determining a distance between the optical center of the camera and a vanishing line determined by connecting two or more vanishing points determined by processing the image of the two-dimensional calibration pattern, wherein the vanishing points are locations in the image where parallel lines in the two-dimensional calibration pattern meet due to perspective distortion.

7. The system of claim 1, the instructions including further instructions to determine the object speed and the object direction by determining and the object location in a time series of video frames.

8. The system of claim 1, the instructions including further instructions to download the object data to a vehicle.

9. The system of claim 1, wherein the processor is included in a traffic infrastructure system.

10. The system of claim 1, wherein the camera is a stationary video camera.

11. A method, comprising:
    determining camera calibration parameters for a camera including camera focal distance, camera height and camera tilt based on a two-dimensional calibration pattern located parallel to and coincident with a ground plane determined by a roadway surface; and
    determining object data including object location, object speed and object direction for one or more objects in a field of view of the camera including determining distances to objects as measured on the roadway surface in image data based on a vanishing point determined in the image data, measuring fiducials, and determining a camera calibration constant C based on the camera focal distance, the camera height, and the camera tilt.

12. The method of claim 11, further comprising determining a ground plane by fitting a plane to real-world locations of points measured on the roadway surface in the field of view of the camera.

13. The method of claim 11, wherein the camera calibration parameters transform pixel data into real-world coordinates.

14. The method of claim 11, further comprising determining the camera focal distance by determining a distance between an optical center of the camera and a camera sensor plane by processing an image of the two-dimensional calibration pattern.

15. The method of claim 14, further comprising determining the camera height by determining a distance between the optical center of the camera and a ground plane by processing the image of the two-dimensional calibration pattern.

16. The method of claim 15, further comprising determining the camera tilt by determining a distance between the optical center of the camera and a vanishing line determined by connecting two or more vanishing points determined by processing the image of the two-dimensional calibration pattern, wherein the vanishing points are locations in the image where parallel lines in the two-dimensional calibration pattern meet due to perspective distortion.

17. The method of claim 11, further comprising determining the object speed and the object direction by determining the object location in a time series of video frames.

18. The method of claim 11, further comprising downloading the object data to a vehicle.

19. The method of claim 11, wherein the processor is included in a traffic infrastructure system.

20. The method of claim 11, wherein the camera is a stationary video camera.

* * * * *